(12) United States Patent
Gainor et al.

(10) Patent No.: US 9,528,537 B2
(45) Date of Patent: Dec. 27, 2016

(54) STRESS CONCENTRATION REDUCTION METHOD AND DESIGN FOR IMPROVED FATIGUE PERFORMANCE

(71) Applicant: HLT, Inc., Maple Grove, MN (US)

(72) Inventors: John P. Gainor, Mendota Heights, MN (US); Todd J. Mortier, Mound, MN (US)

(73) Assignee: HLT, Inc., Maple Grove, MN (US)

( * ) Notice: Subject to any disclaimer, the term of this patent is extended or adjusted under 35 U.S.C. 154(b) by 0 days.

(21) Appl. No.: 14/211,945

(22) Filed: Mar. 14, 2014

(65) Prior Publication Data

US 2016/0084282 A1 Mar. 24, 2016

Related U.S. Application Data

(60) Provisional application No. 61/800,078, filed on Mar. 15, 2013.

(51) Int. Cl.
| | |
|---|---|
| *B23P 11/02* | (2006.01) |
| *F16B 4/00* | (2006.01) |
| *F16B 1/00* | (2006.01) |
| *F16B 17/00* | (2006.01) |
| *H02G 15/18* | (2006.01) |
| *F16B 7/04* | (2006.01) |

(52) U.S. Cl.
CPC ............... *F16B 4/008* (2013.01); *B23P 11/02* (2013.01); *B23P 11/025* (2013.01); *F16B 1/0014* (2013.01); *F16B 17/004* (2013.01); *B23B 2240/28* (2013.01); *F16B 7/0426* (2013.01); *H02G 15/1806* (2013.01); *Y10T 29/49865* (2015.01)

(58) Field of Classification Search
CPC .. Y10T 29/49865; Y10T 403/48; F16B 4/006; F16B 4/008; F16B 4/00; B23P 11/02; B23P 11/025; B23B 2240/28; F16D 1/0858; H02G 15/1806; F16L 47/22
See application file for complete search history.

(56) References Cited

U.S. PATENT DOCUMENTS

| | | | |
|---|---|---|---|
| 1,043,806 A | 11/1912 | Dahl | |
| 3,551,999 A * | 1/1971 | Gutmann | ............... B21D 39/04 29/517 |
| 3,902,747 A | 9/1975 | Weinhold | |
| 4,141,576 A | 2/1979 | Lupke et al. | |
| 4,392,294 A * | 7/1983 | Campbell | ............... B23P 11/02 29/451 |

(Continued)

FOREIGN PATENT DOCUMENTS

| | | | | |
|---|---|---|---|---|
| DE | 19852010 A1 * | 5/2000 | ......... | H01F 27/2828 |
| DE | 102012223650 A1 * | 6/2014 | ............... | H02G 1/14 |

(Continued)

OTHER PUBLICATIONS

WIPO, U.S. International Search Authority, International Search Report and Written Opinion mailed Jul. 24, 2014 in International Patent Application No. PCT/US2014/027964, 8 pages.

*Primary Examiner* — Jermie Cozart
(74) *Attorney, Agent, or Firm* — Inskeep IP Group, Inc.

(57) ABSTRACT

A method of reducing the concentration of stress that occurs when joining two cylindrical component ends with a tube. Grooves are placed near the ends of the cylindrical components that alleviate the stress/strain felt by the cylindrical components when undergoing flex cycling.

8 Claims, 3 Drawing Sheets

(56) References Cited

U.S. PATENT DOCUMENTS

| | | | |
|---|---|---|---|
| 4,797,509 A * | 1/1989 | Cook | H01R 4/20 156/49 |
| 2005/0137614 A1 | 6/2005 | Porter et al. | |

FOREIGN PATENT DOCUMENTS

| | | | |
|---|---|---|---|
| FR | 2789471 A1 | | 11/2000 |
| JP | 05008117 A | * | 1/1993 |

* cited by examiner

STRESS CONCENTRATION REDUCTION METHOD AND DESIGN FOR IMPROVED FATIGUE PERFORMANCE

RELATED APPLICATIONS

This application claims benefit of and priority to U.S. Provisional Application Ser. No. 61/800,078 filed Mar. 15, 2013 entitled Stress Concentration Reduction Method And Design For Improved Fatigue Performance, which is hereby incorporated herein by reference in its entirety.

BACKGROUND OF THE INVENTION

Metal materials such as Nitinol and stainless steel are often used in the construction of implantable medical devices. Permanent implantable devices are required to survive under cyclical loading for millions and often times hundreds of millions of cycles. Stress raisers can be created in geometries with large and sharp or abrupt dimensional changes. These stress concentrations can cause difficult-to-predict fatigue failures. The design of component geometry and joining methods is critical to assuring long-term survival.

OBJECTS AND SUMMARY OF THE INVENTION

The disclosed invention consists of a design for reducing and controlling stress concentration in and near a joint. The design is most relevant to crimp and swaging methods for joining cylindrical components. These methods involve placing a tube over the butted ends of the cylindrical components and then deforming it to create an interference fit with the cylindrical components. The deformation can be created by crimping the tube to the cylindrical components, thereby indenting the tube at one or several points, by swaging the tube to the cylindrical components, or by mechanical and/or thermally expanding the tube and allowing it to elastically recover to compress onto the cylindrical components. This invention is particularly useful in joints where there are contact forces between the tube and the cylindrical components and where there are high circumferential stresses within the tube. Tube geometries aimed at reducing stress concentrations often lead to fatigue fracturing of the tube due to post-assembly stress and/or strain within the tube. The invention may also have application for rotating solid shafts.

One aspect of the invention provides joining two cylindrical components together with a tube by creating a circumferential groove or indentation in the cylindrical components in order to reduce the stress at the edge of the tube.

Another aspect of the invention provides joining two cylindrical components together with a tube by creating a circumferential groove or indentation in the cylindrical components in order to reduce the stress at the edge of the tube and then placing the ends of the cylindrical components in the tube such that the ends of the tube overhang the grooves.

Another aspect of the invention provides joining two cylindrical components together with a tube without crimping the tube by using a tube that is formed of a phase-changing material, bringing the temperature of the tube to a point where the tube achieves an elastic phase, mechanically expanding the tube to accept the ends of the cylindrical components, and then allowing the tube to resume a temperature at which the tube is no longer in the elastic phase. This is being referred to herein as a cryojoint design.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which.

DESCRIPTION OF EMBODIMENTS

Figure 1:
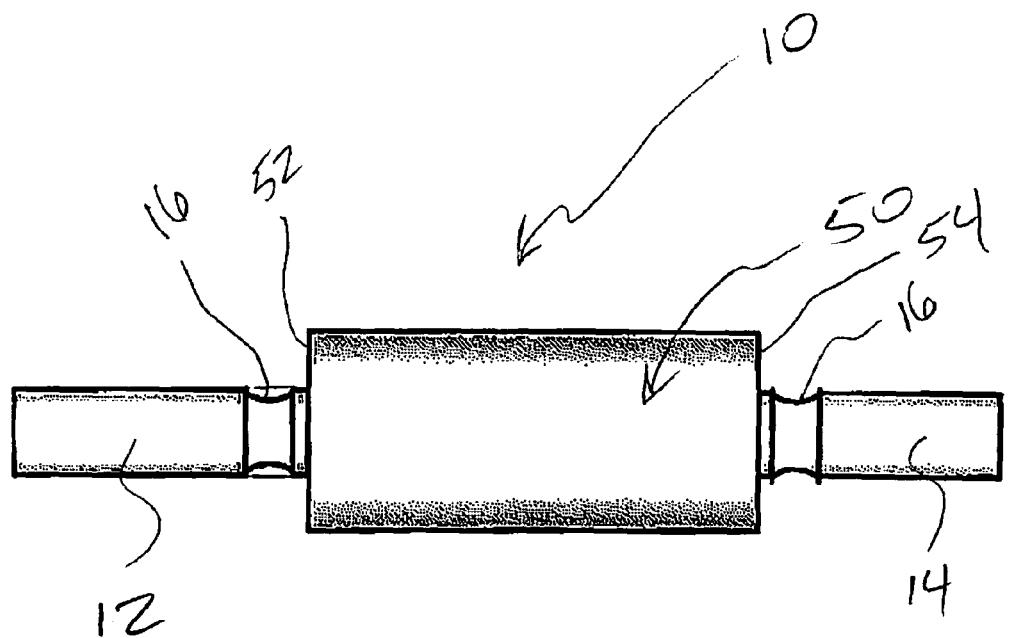
FIG. 1 is a profile of a connection of the invention.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

Figure 2:
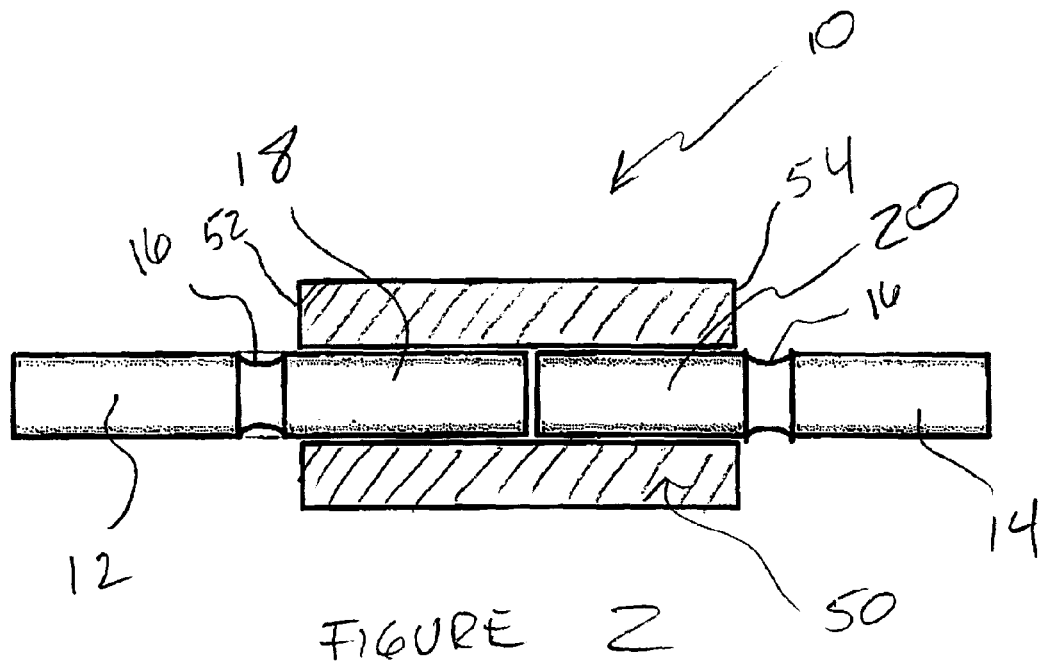
FIG. 2 is a sectional view of a connection of the invention.

Referring now to the Figures, and first to FIGS. 1 and 2, an embodiment of the invention 10 is represented by two cylindrical component ends 12 and 14 of either a single component or different components, that are joined together with a connecting tube 50. A circumferential groove 16 has been formed in each of the ends 12 and 14. The groove 16 is circumferential in that it extends around the circumference of the cylindrical components. The groove is curved, as shown in the figures, but this curve may be in the form of a semi-circle, oval, ellipse or other curves. Additionally, the groove 16 may be other shapes.

The grooves 16 are located near the ends 52 and 54 of the connecting tube 50. In FIGS. 1 and 2, the grooves 16 are located just outside the ends 52 and 54 of the connecting tube. This embodiment may be particularly useful for applications where it may not be desired to allow fluid to come between the tube 50 and the cylindrical component ends 12 and 14.

The grooves 16 alleviate stress/strain felt in the areas 18 and 20 of the components 12 and 14 that are adjacent to the grooves 16. By connecting the tube 50 such that the edges 52 and 54 contact these areas 18 and 20, respectively, stress concentration is reduced.

Figure 3:
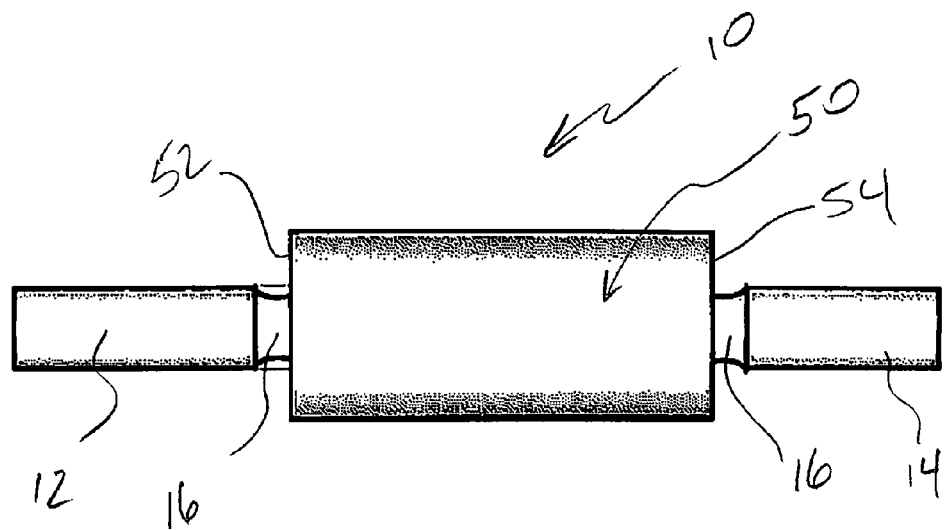
FIG. 3 is a profile of a connection of the invention.
Figure 4:
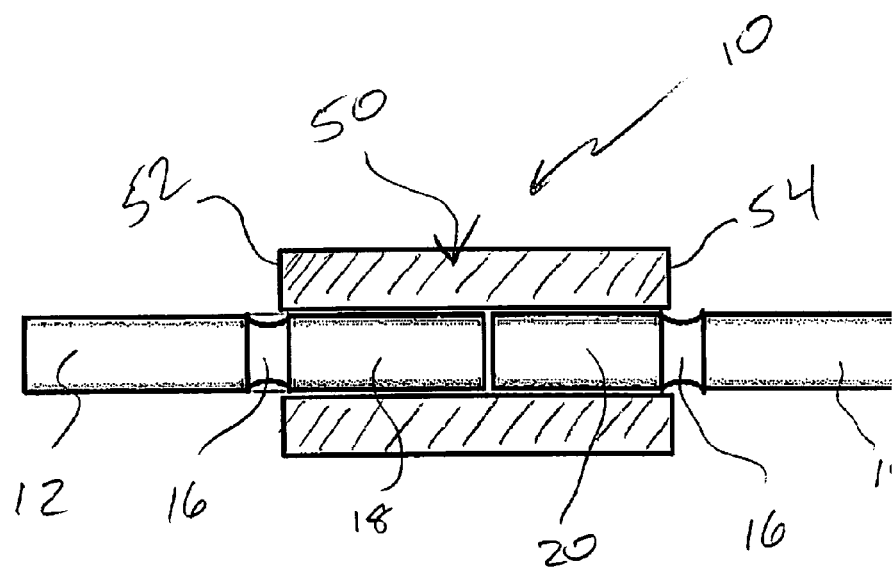
FIG. 4 is a sectional view of a connection of the invention.
Figure 5:
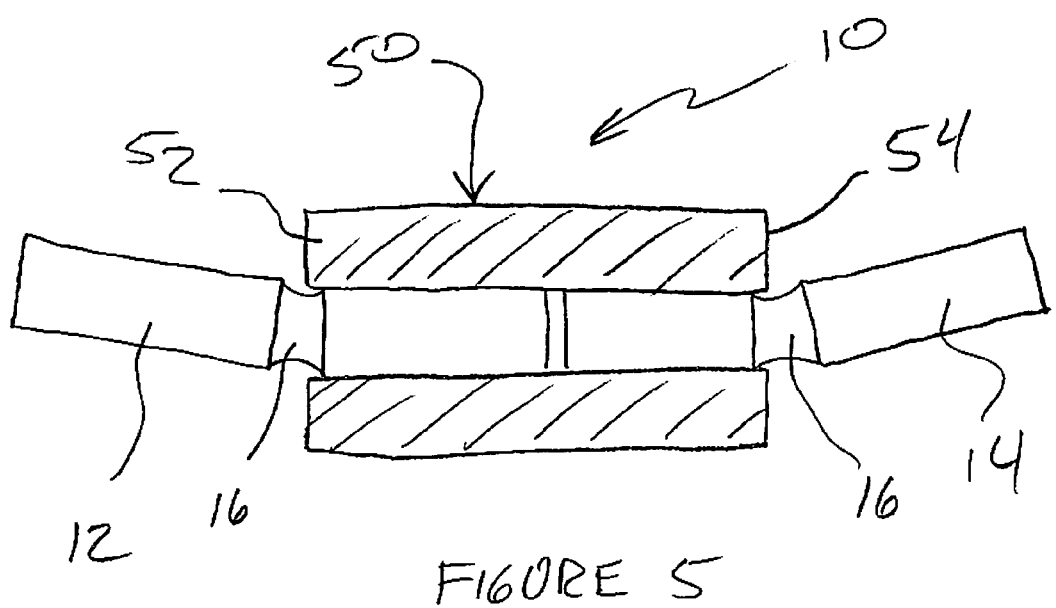
FIG. 5 is a sectional view of a connection of the invention undergoing flex.

However, as shown in FIGS. 3 and 4, the grooves 16 may be located such that the ends 52 and 54 of the tube 50 overhang the grooves 16. This may be advantageous in that no abrupt dimensional changes occur once the tube 50 is joined to the component ends 12 and 14. In other words, once the tube 50 is joined to the component ends 12 and 14, the three distinct components, 12, 14 and 50, are tightly joined and act as a single component. When the grooves 16 are located as shown in FIGS. 3 and 4, flexing of the components 12 and 14 occurs without stress/strain, or with reduced stress/strain occurring at the intersection of the edges 52 and 54 and the cylindrical component ends 12 and 14. This is best seen in FIG. 5. Stress is thus eliminated at the edges 52 and 54.

To illustrate the reduction of stress concentration using the method of the invention, the embodiments shown in the Figures were constructed and underwent FEA testing. Radial compression was applied to an end of a wire attached to another wire. At the opposite end of the wire, a force is applied creating a bending moment in the wire. Three scenarios are illustrated: tube on wire (both cylindrical), grooved wire with the tube edge positioned near the groove (as in FIGS. 1 and 2) and a grooved wire with the tube edge suspended over the wire grove. The tensile stress profiles of the wire to wire and tube transitions showed good results and significantly reduced stress concentrations.

Any of the embodiments discussed heretofore may be used with the aforementioned cryojoint design. The cryojoint design uses a Nitinol tube to join two ends of a cylindrical component, such as a wireform of a prosthetic valve, together in a manner that provides good tensile and torsional strength while demonstrating a resistance to cyclic fatigue at strain levels expected in a hemodynamically loaded device such as a heart valve. In the past, a mechanical crimp tool has been used to plastically deform the Nitinol tube and the underlying wire in order to create an interference-joint between the members. This is effective at creating a joint with good tensile and torsional strength, but the deformation of the tube and the wire reduced the strain threshold at which the crimped segment could survive fatigue.

The premise of the cryojoint is to use the temperature-based phase transition of Nitinol, sometimes called "shape memory," to develop a compressive joint between the wire and the tube. Nitinol has a property in which at a given temperature, the material phase is a cubic crystal structure called austenite—the parent phase at which the material is considered superelastic and is able to withstand relatively high strains without exhibiting permanent deformation. At a lower temperature, Nitinol spontaneously transforms to a daughter phase monoclinic crystal structure called martensite. The martensite structure has the ability to undergo limited deformation through the rearrangement of atomic planes without permanently deforming the material, and upon heating the material past the transformation temperature the shape spontaneously changes back to the original austenitic configuration regardless of the deformation of the material while in the martensitic state.

The cryojoint is formed by procuring a tube with an inner diameter slightly smaller than the outside diameter of the wire while in the austenitic phase. This tube is then chilled below the transformation temperature of the wire, changing the crystal structure of the material to martensite. Once the phase transformation has occurred, the tube can be expanded to increase the inner diameter to accommodate the wire diameter. While maintaining the expanded tube in the chilled configuration, the wire ends to be joined are inserted into the tube and the tube is heated to bring it back to an austenitic phase. This transition back to austenite reverses the expansion of the tube, as the tube attempts to return to its pre-expanded diameter. The inner surface of the tube engages the outer surface of the wire, imparting a compressive load at the wire/tube interface and creating the joint.

The strength of the joint and the residual stress remaining in the tube and the wire post-assembly can be modified by manipulating the relationship between the inner diameter of the tube and the outer diameter of the wire, the wall thickness of the tube and the length of the tube engagement with the wire. Careful calculation must be performed to ensure that the expansion required of the tube does not raise the strain to the point that plastic deformation occurs, and that the manufacturing tolerance requirements for both the tube and the wire can produce a robust connection at both minimum and maximum interference conditions.

This joint results in a uniform connection between the wires and the tube, with little potential for distortion of the underlying wire and the cryo tube. Fatigue resistance of a joint such as this has been demonstrated to be superior to a mechanically crimped joint, and tensile and torsional strengths are equivalent to existing crimp joints.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

We claim:

1. A method of connecting two wire ends together comprising:
   providing a connector tube comprising a shape memory material and having an inner diameter smaller than that of a diameter of the two wire ends to be connected together;
   chilling the connector tube below a transformation temperature of the shape memory material;
   expanding the connector tube such that said inner diameter increases above the diameter of the two wire ends to be connected together;
   inserting said two wire ends into opposite ends of the connector tube;
   allowing a temperature of said connector tube to increase above said transformation temperature, thereby causing said connector tube to transition to austenite and shrink onto said wire ends.

2. The method of claim 1 further comprising forming a circumferential groove near each end of said two wire ends.

3. The method of claim 2 wherein inserting said two wire ends into opposite ends of the connector tube comprises inserting said two wire ends into opposite ends of the connector tube such that edges of said opposite ends overhang said circumferential grooves.

4. The method of claim 2 wherein inserting said two wire ends into opposite ends of the connector tube comprises inserting said two wire ends into opposite ends of the connector tube such that edges of said opposite ends are located adjacent said circumferential grooves.

5. The method of claim 2 wherein allowing a temperature of said connector tube to increase above said transformation temperature comprises allowing a temperature of said connector tube to return to room temperature.

6. The method of claim 5 wherein allowing a temperature of said connector tube to increase above said transformation temperature comprises heating said connector tube to room temperature.

7. The method of claim 1 wherein providing a connector tube comprising a shape memory material comprises providing a connector tube comprising nitinol.

8. The method of claim 1 wherein chilling the connector tube below a transformation temperature of the shape memory material causes said shape memory material to transition from austenite to martensite.

* * * * *